(12) United States Patent
Rolt

(10) Patent No.: US 7,317,261 B2
(45) Date of Patent: Jan. 8, 2008

(54) POWER GENERATING APPARATUS

(75) Inventor: Andrew Martin Rolt, Allestree (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/491,905

(22) Filed: Jul. 25, 2006

(65) Prior Publication Data

US 2007/0176432 A1    Aug. 2, 2007

Related U.S. Application Data

(63) Continuation of application No. PCT/GB2005/000520, filed on Feb. 14, 2005.

(30) Foreign Application Priority Data

Feb. 20, 2004    (GB) .................................. 0403892.3

(51) Int. Cl.
*F03D 9/00* (2006.01)
(52) U.S. Cl. ............................ 290/55; 290/44; 244/24; 415/3.1
(58) Field of Classification Search .................. 290/43, 290/44, 54, 55; 244/24, 31; 415/3.1; 416/132
See application file for complete search history.

(56) References Cited

U.S. PATENT DOCUMENTS

| | | | | |
|---|---|---|---|---|
| 4,166,596 A | * | 9/1979 | Mouton et al. | 244/30 |
| 4,572,962 A | * | 2/1986 | Shepard | 290/55 |
| 4,832,571 A | * | 5/1989 | Carrol | 416/132 B |
| 5,520,505 A | * | 5/1996 | Weisbrich | 415/4.1 |
| 6,489,691 B1 | * | 12/2002 | Lang | 290/44 |
| 6,616,402 B2 | * | 9/2003 | Selsam | 415/3.1 |
| 6,781,254 B2 | * | 8/2004 | Roberts | 290/55 |
| 7,129,596 B2 | * | 10/2006 | Macedo | 290/55 |
| 7,188,808 B1 | * | 3/2007 | Olson | 244/153 R |

* cited by examiner

*Primary Examiner*—Nicholas Ponomarenko

(74) *Attorney, Agent, or Firm*—W. Warren Taltavull; Manelli Denison & Selter PLLC

(57) ABSTRACT

Power generating apparatus (10) including a cable (12) which rotatably mounts a plurality of power units (14). The power units (14) include wind power turbines (46) for producing power from the wind as the power units (14) fly in the sky whilst connected to the cable (12).

101 Claims, 9 Drawing Sheets

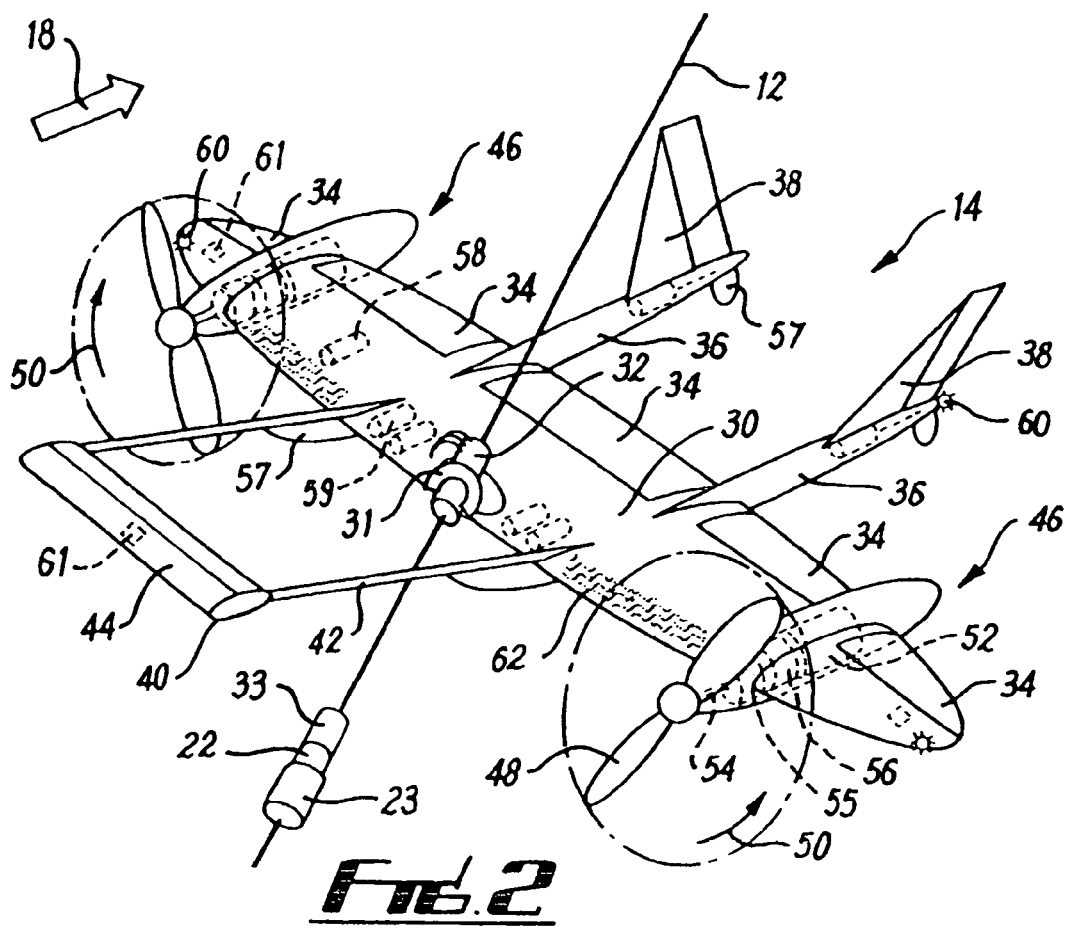
FIG. 2
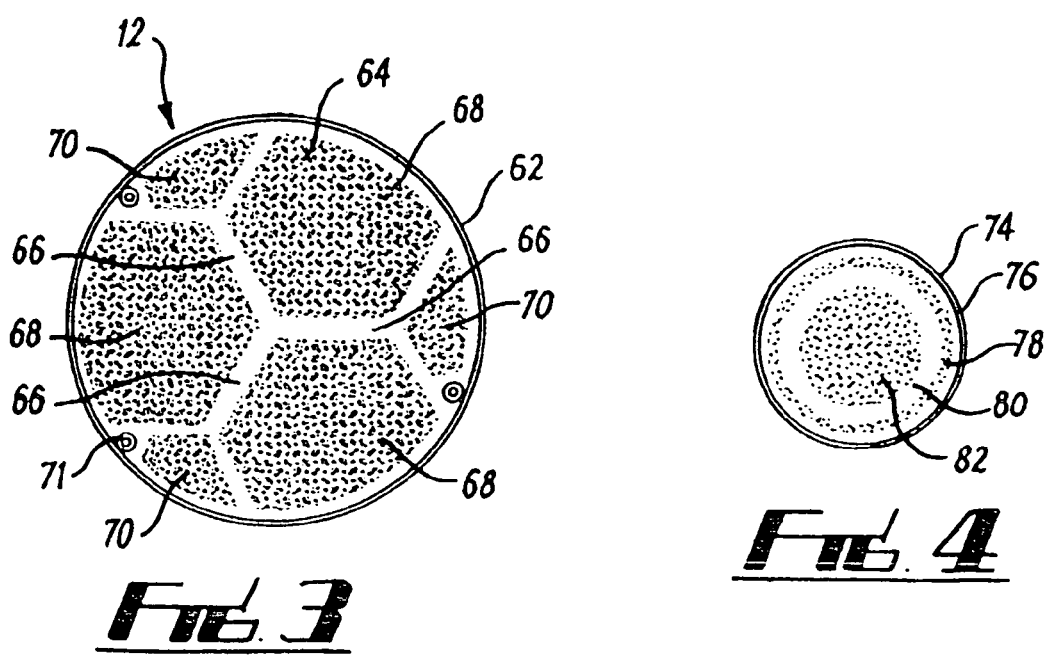
FIG. 3
FIG. 4

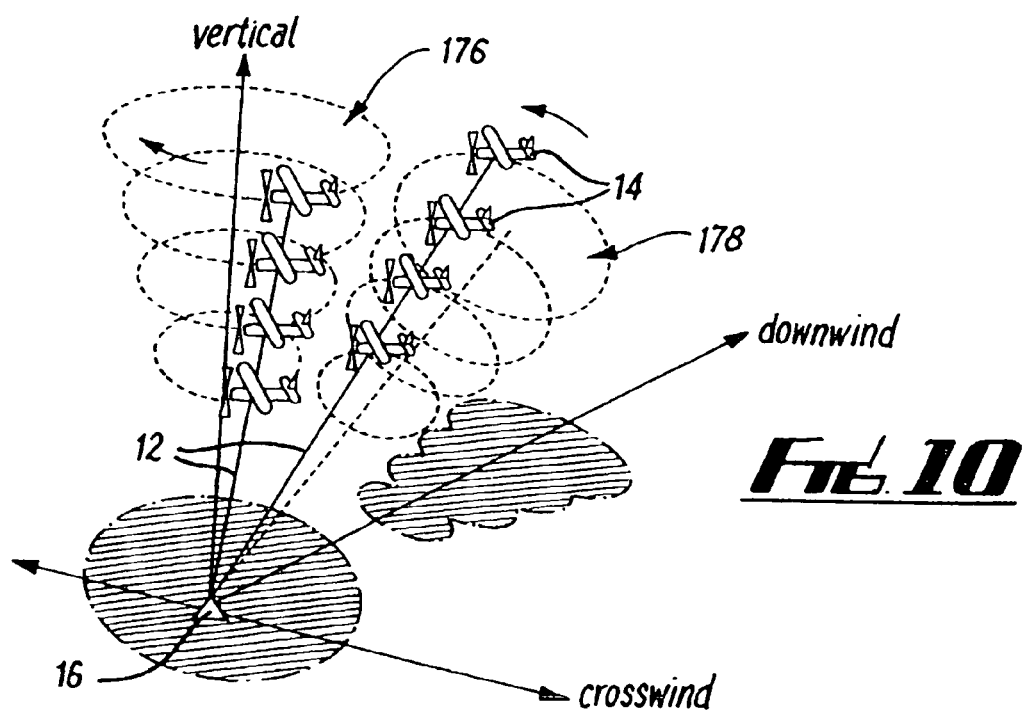
_FIG. 10_
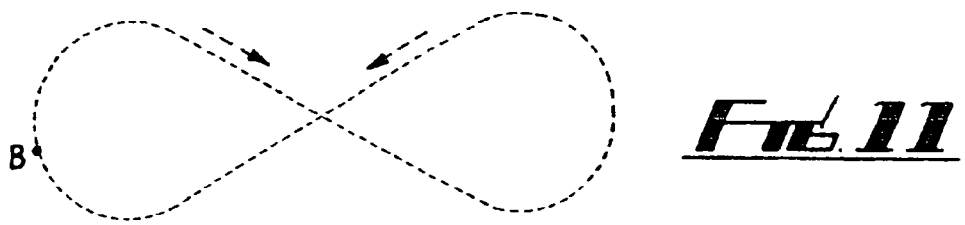
_FIG. 11_
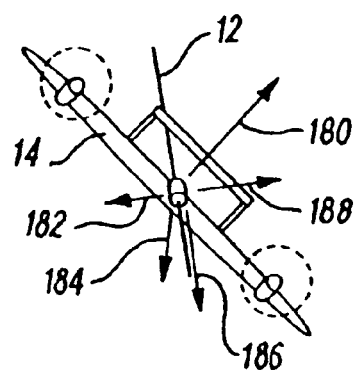
_FIG. 12_
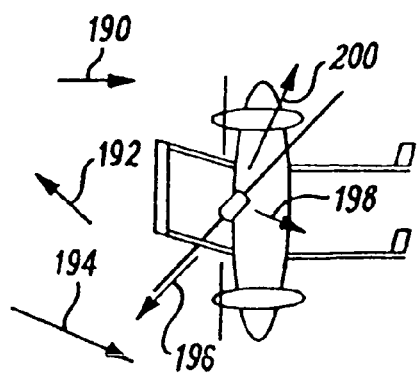
_FIG. 13_

POWER GENERATING APPARATUS

This is a continuation of International Application Number PCT/GB2005/000520 filed Feb. 14, 2005, designating the United States.

This invention concerns power generating apparatus and also a method of operating power generating apparatus.

The use of wind power to produce electricity is increasing. It is known that significantly greater amounts of power can be obtained from wind at high altitudes where the wind velocities are higher and more consistent. Prior arrangements have been proposed to produce power from high altitude winds and these have generally included using a wind turbine which is tethered to the ground, and held up by a kite or a lighter than air vehicle. These have not however proved particularly satisfactory.

According to the present invention there is provided power generating apparatus, the apparatus comprising a power generating assembly including a plurality of power units each including a wind power turbine, the units being attached sequentially to a cable, with one end of the cable being mountable to the ground with the cable extending upwardly therefrom such that the power units are located above the ground and can be driven by the wind.

Each assembly may include greater than 20 power units, preferably greater than 50 power units, and desirably greater than 100 power units.

The cable is preferably greater than 1,000 m long and may be greater than 5,000 m long.

Each wind power turbine preferably includes one or more turbine rotors.

Some or all of the power units may be configured to generate aerodynamic lift, and the assembly may be configured such that the aerodynamic lift generated by the power units in use maintains the cable substantially taut. Some or all of the power units may include a wing to generate aerodynamic lift. Some or all of the power units may include rotors to generate aerodynamic lift. Some or all of the power units may include a rotor or rotors rotatable about a substantially vertical axis in use, which rotors may provide power extraction and lift. The rotor or rotors may be retractable, or movable, to for instance prevent damage during landing.

Each power unit is preferably attached to the cable such that the power unit can be optimally aligned relative to the wind velocity vector.

A mounting means may be provided on each power unit which provides attachment to the cable. The mounting means preferably permits the units to freely rotate about the cable, whereby to prevent significant torsional loads on the cables. The mounting means may be in the form of gimbals, and the centre of rotation is preferably at or close to the centre of gravity of the power units.

The lift vector of each power unit may be adjustable in magnitude and direction. Adjustable aerodynamic control surfaces may be provided to permit adjustment of the lift vector. Some or all of the power units may include rotors with variable cyclic and/or collective pitch to permit adjustment of the lift vector. The assembly is preferably configured such that by adjusting the lift vectors of some or all of the power units, the altitude of the power units and also the tension in the cable can be controlled.

The assembly is preferably configured such that by adjusting the lift vectors of some or all of the power units it is possible to manoeuvre the assembly relative to the wind vector field.

The assembly may include means for providing power to drive one or more of the power units so as to provide lift, whereby to retain the assembly in the air even at very low wind speeds.

The assembly may be arranged such that power can be provided through the cable to drive said one or more power units as a motor, with the turbine rotor acting as a propeller.

Alternatively said one or more power units may include an internal combustion engine to selectively drive the unit. The engine may drive the turbine rotor, or may generate electricity to cause the turbine to operate as a motor. In one arrangement the internal combustion engine may drive an auxiliary propeller, which propeller may be featherable, retractable and/or foldable.

Control means may be provided to permit the lift vectors of each power unit to be controlled whereby to anticipate changes in wind direction and to accommodate windshear and gusts, and also to take evasive action if approached for instance by a small tornado or a stray aircraft such as a weather balloon.

The assembly may be selectively detachable from the ground, and may be arranged such that when detached the assembly can be flown, propelled by at least some of the powered power units, to a required location.

The apparatus may include a cable anchorage. The cable anchorage is preferably arranged so as to permit the cable when attached thereto, to be movable relative to the anchorage in three dimensions, while maintaining electrical connection therewith.

The assembly may include lightning strike handling equipment, and may include any of protective earth conductors, Faraday cages, or electrodes.

One or more transponders may be provided on the assembly to warn aircraft of the existence and location of the assembly.

The cable may be arranged to transmit power generated by the units to the cable anchorage. Two or more insulated electrical conductors may be provided in the cable for transmitting power generated by the units to the cable anchorage, and a potential difference may be provided between the electrical conductors.

Where the power units are freely rotatable about the cable, electrical connections are preferably provided between the units and electrical conductors in the cable, and the connections may be in the form of slip rings or an electrical transformer. The electrical transformer may include a first set of windings attached to the unit, and a second set attached to the cable.

Alternatively, power may be transported along the cable by the flow of one or more fluids in pipes located in the cable. In this arrangement the downwards flowing fluid is preferably held at a higher pressure than the upwards flowing fluid. Power may be transmitted by means of the pressure differential, or by means of chemical changes in the fluid such that the downward flowing fluid has higher internal energy than the upwards flowing fluid.

In a further alternative, power may be transmitted from the power units independently of the cable, and power may be transmitted by beams of microwave radiation.

One or more of the power units may include energy storage systems such that said unit or units can be driven using power from the energy storage systems. The energy storage systems may use batteries or include a chemically transformable fluid, and such energy storage systems may be selectively rechargeable as required.

The apparatus may be arranged such that an assembly can take off from the ground and/or land on the ground, with the power units acting as aircraft, and in one arrangement at least some of the power units are powered to take off in the nature of an aeroplane. During take off the power units may be powered by their energy storage systems. Alternatively, or in addition, during take off the power units may have power provided by microwave aerials or photocells.

The apparatus may be arranged such that an assembly can be towed by an aircraft during take off and/or landing on the ground.

To ensure ground clearance for the rotors being used in a self-powered take-off, the power units may include fixed or retractable undercarriage units. Alternatively detachable carts may be provided upon which the power units can ride during take-off, but which carts remain on the ground. The rotors may be folded or feathered in a horizontal position for landing to protect them from damage.

Each power unit preferably has a discrete control system. The control system is preferably remotely operable, desirably by radiotelephony.

The cable is preferably provided in a number of detachable segments such that the length of the cable can be varied. Desirably a plurality of power units are provided on each segment.

Each segment may be arranged to be selectively disengageable from a power source in the cable in adjacent segments. The spacing of the power units on the cable may vary along the length thereof, and for instance the spacing may be reduced away from the ground.

The thickness of the cable may reduce away from the ground.

One or more lift units may be provided on the cable, which lift units don't include a wind power turbine but do include means for generating aerodynamic lift. The lift units may be provided on the cable towards the lower end thereof in use.

One or more driving units may be provided which include means for driving the unit but do not include a wind power turbine. The unit driving means may include at least one motor driven propeller. The driving units may include means for generating aerodynamic lift.

Each wind power turbine preferably includes one or more electrical generators, which operates at a first lower voltage, which voltage is transformed to a second higher voltage for transmission along the cable. The first voltage may be transformed to the second voltage by electrical transformers.

Each power unit may include a step up gear box to enable both the rotors and the electrical generators to run at their optimum speeds.

The apparatus may be arranged such that during operation the alternating current generators for each power unit can be synchronised, and the power generators could be synchronised with the local power grid for onwards transmission.

The apparatus may be arranged such that oscillations or vibrations within a power generating assembly are effectively damped.

Each power unit, lift unit and/or driving unit is preferably provided with a set of receivers for a local or a global positioning system, and desirably for a differential global positioning system. A plurality of receivers for a global positioning system are preferably provided on each power unit, lift unit and/or driving unit at different positions on the unit to enable the orientation of each unit to be determined. Receivers may also be provided on connectors at the ends of the cable segments.

Each power unit may include two wind power turbines, with desirably one on each side thereof. Each power unit may include a wing, which wing preferably includes one or more pivotal control surfaces. The wind power turbines may be mounted on the wing.

Each power unit is preferably configured such that in a normal orientation the wing extends substantially horizontally, with the rotors of the wind power turbines facing the relative wind velocity vector.

The rear of each power unit may include a pair of spaced booms extending rearwardly from the wing to the empennage, to provide clearance for the cable.

The rotors of each power unit may be provided with variable pitch control.

The apparatus may include a plurality of assemblies, each with a cable and a plurality of power units. The apparatus may be arranged such that each assembly can be controlled to prevent contact between the cables and power units of adjacent assemblies.

One or more lighter than air members may be attached to the cable to provide lift. The lighter than air members may be in the form of balloons or airships.

In one embodiment, the lift units may comprise first and second hulls, each hull may comprise an inflatable member comprising a gas of less density than air, for example helium. This embodiment may include a connection member extending between the hulls, and the cable may extend through the connecting member. Fins and/or wings may be provided to stabilise and/or provide aerodynamic lift to the lift unit.

The invention also provides a method of operating a power generating apparatus according to any of the preceding forty three paragraphs, the method including maintaining an assembly trailing downwind in high and moderately high wind speed conditions.

The method preferably also includes, when the wind speed reduces, controlling the power units, lift units and/or driving units such that the assembly moves substantially in a circle above the ground mounting so that if the cable remains taut the assembly defines an imaginary cone.

The method may also include when the wind speed reduces, controlling the power units, lift units and/or driving units such that the assembly moves substantially in a figure of eight above the ground. This movement of the assembly preferably occurs while the fixed length cable remains taut.

The method may also include controlling the power units, lift units and/or driving units such that the tension in the cable is regulated.

The segments of cable and power units thereon preferably take off one at a time, and are sequentially mounted to the ground and to each other in a required position once airborne.

The method may include substantially equalising the number of left hand and right hand turns of the power units around the cable, to minimise the torsional wind-up of the cable.

An embodiment of the present invention will now be described by way of example only and with reference to the accompanying drawings, in which:—

FIG. 2 is a diagrammatic perspective view of part of the apparatus of FIG. 1;

FIG. 3 is a diagrammatic cross sectional view through a cable usable in the present invention;

FIG. 4 is a similar view to FIG. 3 but of an alternative cable;

FIG. 10 is a diagrammatic perspective aerial view of apparatus according to FIG. 1 in use;

FIG. 11 is a diagrammatic view upwards from the ground and along the mean vector of the cable axis showing operation of the apparatus of FIG. 1;

FIGS. 12 and 13 are respectively diagrammatic downwind and crosswind views of power units according to the invention as illustrated at B in FIG. 11;

Figure 1:
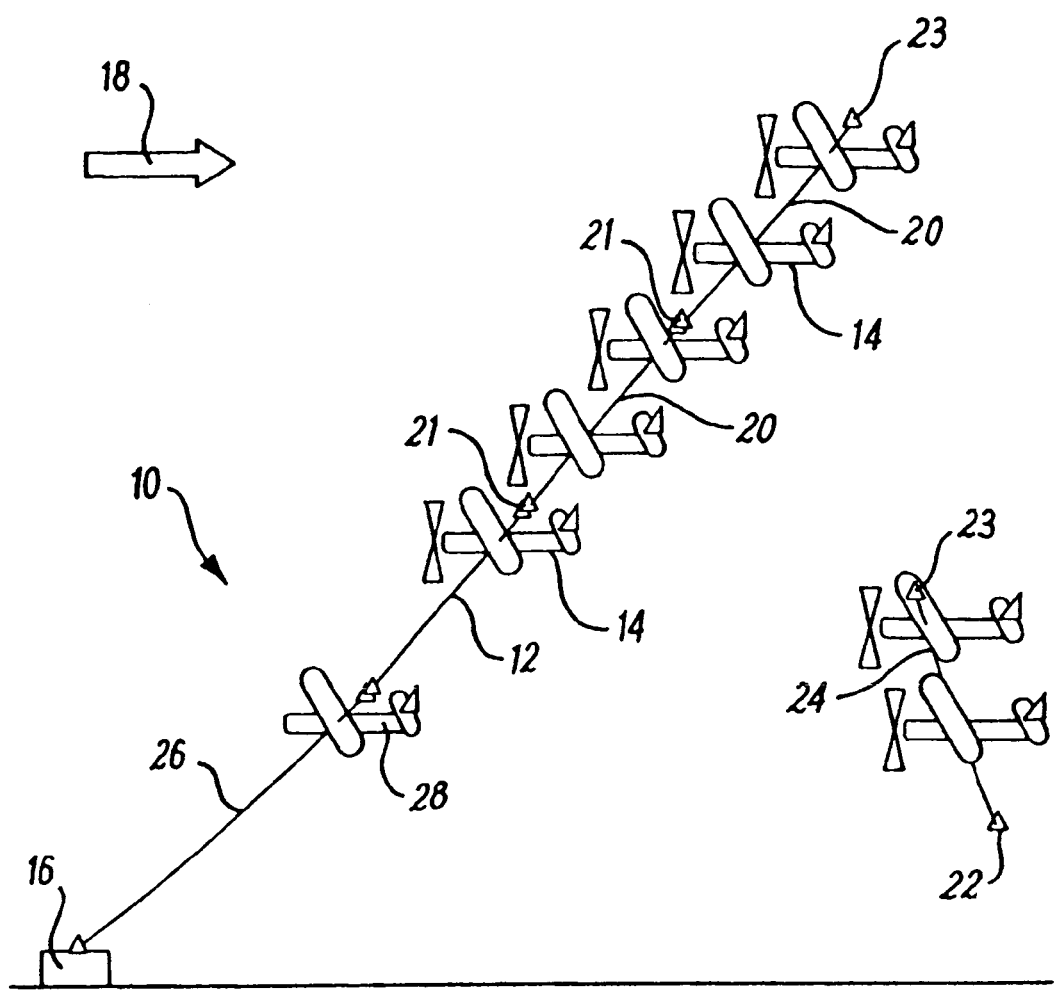
FIG. 1 is a diagrammatic side view of an apparatus according to the present invention in use.
Figure 14:
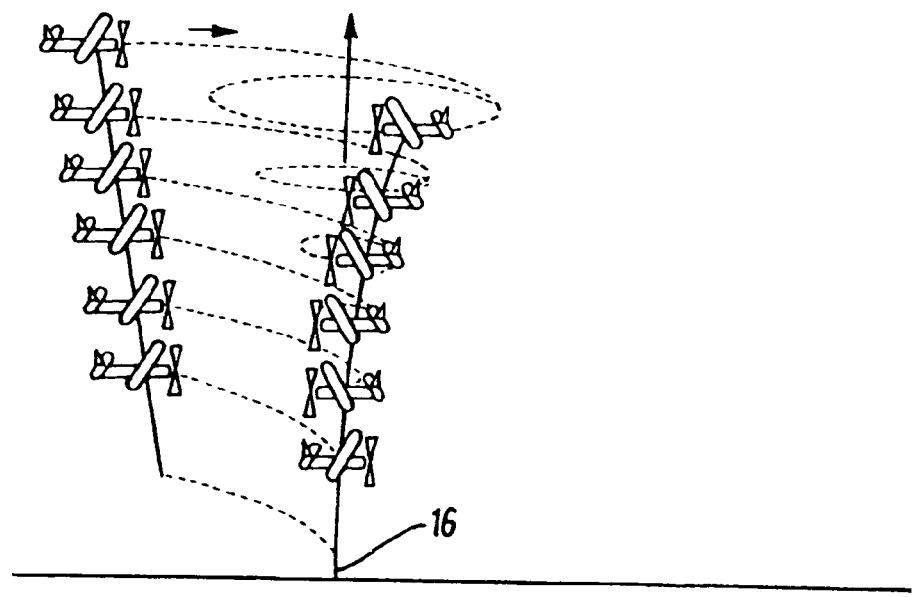
Figure 15:
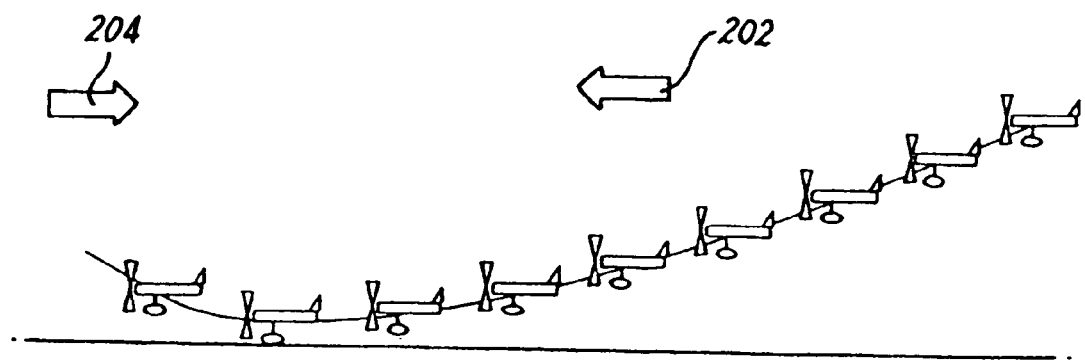
Figure 16:
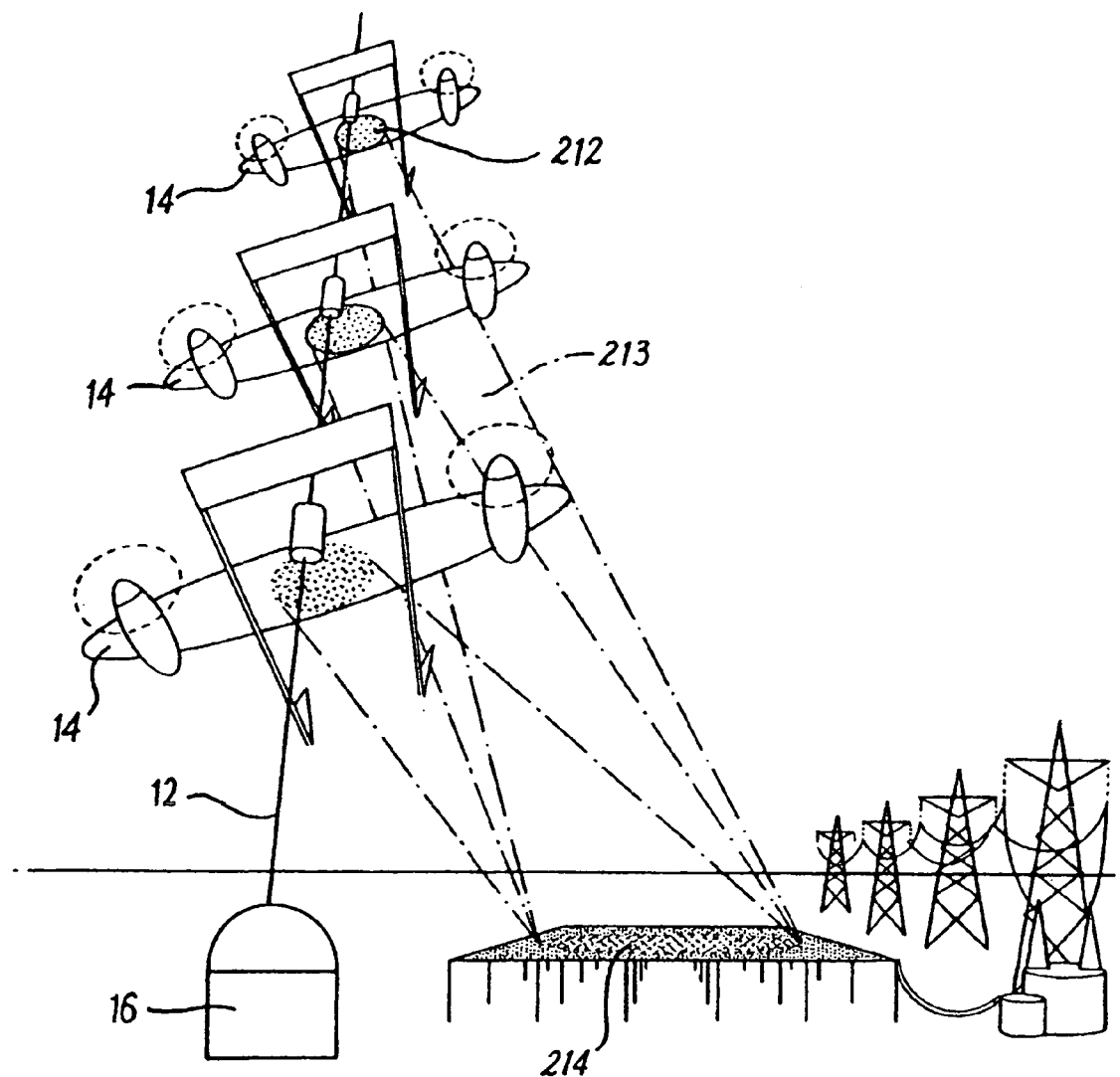
Figure 17:
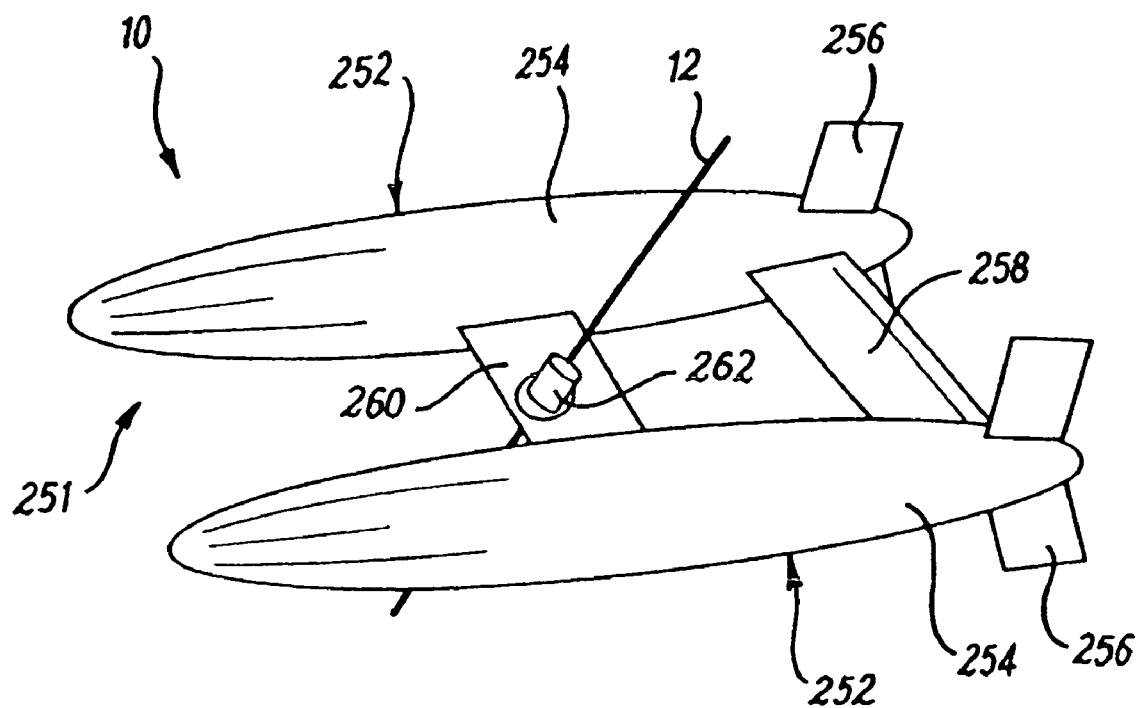

FIG. 14 diagrammatically shows an operation using the apparatus of FIG. 1;

FIG. 15 diagrammatically shows a further operation of the apparatus of FIG. 1;

FIG. 16 is a schematic illustration showing operation of an embodiment of the invention; and FIG. 17 is a diagrammatic representation of a lift unit.

FIG. 1 shows a power generating apparatus 10 according to the invention. The apparatus 10 comprises a power generation assembly including a cable 12 and a plurality of power units 14. The cable 12 is attached to the ground at an anchoring point 16 and extends upwardly and trailing downwind therefrom as shown by the wind direction arrow 18. The cable 12 is divided into a number of segments 20 interconnectable together by connector assemblies 21, comprising connector parts 22 and 23. In FIG. 1 one of the segments here shown at 24 is shown detached from the remainder of the segments 20 but can be connected to the upper end thereof when required by the connector parts 22 and 23.

Each of the segments 20 and 24, with the possible exception of the lowermost segment or segments 26, mounts two or more power units 14, which include wind turbine units for producing power and also for providing thrust if necessary to keep the segments 20, 24, 26 airborne. The power units 14 will be described in more detail with reference to FIG. 2. By having two or more power units 14 on a segment 20, 24, 26 the orientation of the cable can be controlled while the segment 20, 24, 26 is detached from the stack. By having three or more power units 14 on a segment 20, 24, 26 the curvature of the cable 12 can also be controlled.

The lowermost segment or segments 26 may include one or more lift units 28 which are similar to the power units 14 except that they do not include any electricity generating apparatus, but otherwise can lift the cable 12 and apparatus 10.

It is to be realised that FIG. 1 is quite diagrammatic and in practice a much larger number of power units 14 would be provided. In one example a cable with a total length of 8,750 m is provided, with fourteen segments 20 each of 625 m long. Two hundred and fifty power units 14 are provided along the length of the cable 12. The spacing of the power units 14 towards the anchoring point 16 is around 100 m, but decreases to around 25 m towards the top end of the cable 12.

As indicated, FIG. 2 shows a power unit 14 in more detail. The power unit 14 includes a wing 30 which is freely rotatably mounted to the cable 12. The wing 30 is mounted to the cable 12 by a gimbals assembly incorporating thrust bearings 31, and a slip ring unit 32 which will be described in more detail further on. Five movable control surfaces 34 in the form of ailerons and flaps 34 forming part of the rear edge of the wing 30 are provided. Two spaced booms 36 extend rearwardly from the wing 30 and each mount a vertical stabiliser 38. A horizontal stabiliser 40 in the form of two forwardly extending struts 42 and a profiled cross piece 44 is provided on the front of the wing 30.

A wind power turbine 46 is provided towards each end of the wing 30. Each turbine 46 includes a rotor 48 preferably rotatable in the direction shown by the arrow 50 in order to counter the wing tip vortex. The rotor 48 connects to a generator 52 via a shaft 54 and step up gearbox 56. The gearboxes 56 enable both the rotors 48 and generators 52 to run at their optimum speeds. The rotors 48 are provided with variable pitch actuators and variable pitch control and power supply systems 55. The five control surfaces 34 in combination with the movable stabilisers 38 and 40 provide for three axis control of the power unit 14. Further details concerning the apparatus and possible further operation thereof will now be described.

The wind power units 14 are equipped with additional systems, similar to those on conventional aircraft, to enable their safe operation. These systems include landing gear 57, transponders for collision avoidance 58, batteries or fuel cells 59 for reserve power, navigation lights 60, global positioning system (GPS) receivers 61, and systems for airframe anti-icing 62. The landing gear 57 may be in the form of fixed or retractable undercarriage units. Alternatively, detachable carts could be used, which are left behind upon take-off.

By varying the lift vector of each individual power unit 14 using the control surfaces 34, 38 and 40, and also varying the pitch of the rotors 48, each power unit 14 can be controlled to adjust its altitude and orientation on the cable 12. By varying the direction of the lift force of each power unit 14, transverse forces can be provided to manoeuvre the entire stack of power units 14 relative to the wind vector field. By moving the stack in a cross wind direction, it is possible to increase the relative wind velocity in order to sustain power output at reduced wind speeds, and also to maintain lift at even lower wind speeds.

The power units 14 are arranged such that if required, and particularly in very low wind conditions, power can be applied through the cable 12 to drive the turbines 46 as motors rather than generators. This enables the apparatus 10 to remain flying even with very low wind speeds. As the apparatus can be controlled as outlined above, this control can be used to optimise the configuration according to the prevailing wind conditions, to anticipate changes in wind conditions, and to accommodate windshear and gusts. If necessary the apparatus could take evasive action, for instance if approached by a small tornado or a stray aircraft such as a weather balloon.

The apparatus can fly itself freely if necessary, and if for instance very severe weather conditions such as a hurricane or tornado were expected, the cable could be detached from the anchoring point 16 and the apparatus could be controlled so as to fly to a safe location.

The apparatus 10 is designed to withstand frequent lightning strikes and incorporates apparatus to withstand lightning strikes such as protective earth conductors, Faraday cages and electrodes.

As the apparatus 10 can be controlled, a plurality of cables 12 with respective power units 14 can be located in relatively close proximity and controlled in concert so as not to contact each other. This increases the amount of power which can be extracted from a limited volume of airspace.

In general such apparatus would be located away from existing air lanes, and in sparsely populated areas or offshore locations. One or more transponders 58 is provided on the apparatus 10 to enable aircraft to identify and locate such apparatus. An aircraft would be free to fly above the apparatus 10.

Power generated by the power units 14 is transmitted through the cable 12 which has at least two electrical conductors insulated from each other, and having a potential difference between them.

The attachment mechanism 31 attaches the wind power unit 14 to the cable 12 and allows the wind power unit to vary its angle of inclination relative to the cable, and allows the wind power unit to rotate freely about the cable. The mechanism 31 can be in the form of a pair of rolling element bearings and a set of gimbals. Alternatively a spherical ball bushing bearing design may be used. Electric power can be passed between the wind power unit 14 and the cable 12 by means of a power transmission device 32, which may be in the form of a slip ring assembly. A slip ring assembly that is integrated with an attachment mechanism is described in more detail with reference to FIG. 7.

FIG. 3 shows a cable 12 in more detail. The cable 12 is provided with an earthed outer sheath 62, which will provide some protection against lightning strikes. The interior of the cable 12 is provided by conductor material 64 divided up in honeycomb configuration by insulating material 66. This arrangement provides three high voltage high strength multi-strand conductors 68, and three high conductivity low voltage multi-strand conductors 70, one or more of which could also be used as a signal cable. Alternatively one or more dedicated electrical or fibre optic signal cables 71 may be embedded in the cable 12, or the apparatus may rely entirely on radio telephony for the transmission of signals between the power units 14. In the cable 12 the conductor material 64 takes the tensile load, though in an alternative arrangement the insulating material 66 could perhaps take the tensile load.

In this arrangement the main cable voltage would be higher than the generator voltage, but all the generators on a segment would be wired together so that only one three-phase transformer is needed for each cable segment. The advantage of this is that the high voltage conductors only need to be exposed at the ends of the cable segments, and not at every power unit. Consequently the slip ring units only need to deal with the lower voltage and should be less prone to corona discharge problems. The cable needs to be quite stiff in tension, and this stiffness may be obtained by laying-up the multi-strand core conductors helically in layers with the fibres having only a slight twist. The secondary conductors can each be laid-up with more twist to make them more flexible, and the earthed outer sheath can have corrugated or woven construction. The proportions of a slightly corrugated outer sheath can be designed to tune the bending stiffness of the whole cable. The bending stiffness should be high enough to prevent the cable fouling the wind power units or sagging and scraping on the ground during take-off and landing.

An alternative approach to the cable is to simplify the design either by generating at a higher voltage, or by having a separate transformer for each power unit (i.e. for each pair of generators). The potential problems of corona discharge would be addressed by attention to: detail design, insulating materials, sealing, and by maintaining wider gaps between exposed conductors. The cable then needs just the 3 high voltage conductors (and probably also the earthed sheath).

A further option is to move to high voltage dc transmission, by rectifying the output of a step-up transformer. The cable now just needs 2 high voltage conductors (and probably also an earthed sheath) so a coaxial arrangement of conductors in the cable becomes more attractive.

FIG. 4 shows such a cable with an earthed outer sheath 74 with an insulating ring 76 thereinside. Within the ring 76 is an annular high voltage conductor 78. A further insulation ring 80 is provided within the conductors 78, and the ring 80 surrounds a high voltage, multi-strand, high tensile strength conductor 82. The core conductor 82 takes almost the entire tensile load providing for a greatly simplified arrangement. The electrical connections are also simplified. The material for the annular conductor can be optimised for its thermal and electrical properties rather than for its tensile strength.

A coaxial design of cable for ac transmission is also possible, if a further annular conductor and insulating layer are added, but the thermal resistance associated with the extra insulation probably makes the design less attractive for ac than one where all the conductors are brought within one layer of insulation of the outside of the cable. Where a cable combines electrical conductors with fluid transmission then the fluids may be used to cool the cable and/or to even out temperature differences.

The cable anchorage 16 is simplified relative to previously patented altitude wind power designs, as with this invention there is no need for winches to reel the cable in or out. The cable connection to the anchorage must however allow for changes in azimuth angle and inclination, and it must be possible to align the part of the connector attached to the anchorage with the probe connector at the base of the cable, prior to connection. Typically the structure must react loads of several hundred tonnes. It is desirable that the cable attachment also includes a low friction swivelling joint so that the cable is free to spin around its axis in operation. The system will then be failure tolerant, to the extent that the cable will never be overloaded in torsion following the seizure of any one swivel bearing in the stack.

The cable anchorage 16 must also provide for electrical connections, and slip ring units or equivalent systems will be required to prevent the electrical connectors from becoming twisted when the cable spins or the wind power units orbit above the anchorage. If a microwave or fluid power transmission system is used then these features may not be required, but in the fluid power case, hose connections must be provided instead. The cable connector is similar to those used to connect cable segments, and the slip ring units are similar to, but larger than, those between the wind power units 14 and the cable 12.

Figure 5:
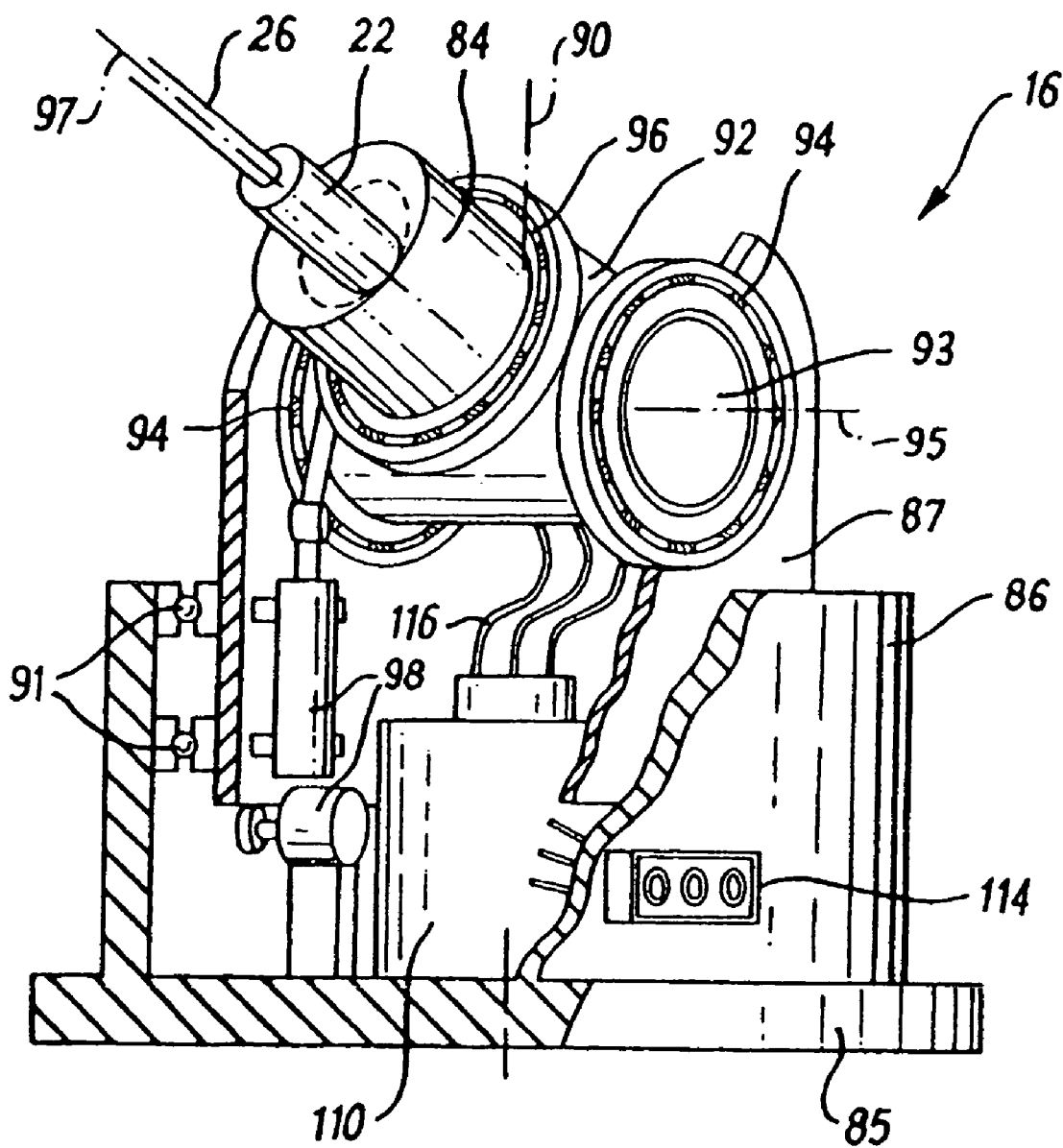
FIG. 5 is a diagrammatic partially cut away view of a cable anchorage usable in the present invention.

FIG. 5 shows a partially cut-away view of a cable anchorage 16. The cable 26 can be attached to or detached from the anchorage 16 by means of connector parts 22 and 84. The anchorage comprises a base 85 fixed securely to the ground or to an offshore structure, and a fixed turret 86, which extends upwards from the base 85. A coaxial rotating turret 87 extends upwardly from the fixed turret 86 and is rotatable relative thereto about a vertical axis 90 by virtue of a pair of annular bearings 91 provided therebetween. An assembly 92, with trunions 93 is attached by two bearings 94 to the rotatable turret 87 so that the assembly 92 is further rotatable about a horizontal axis 95. The connector 84 is attached to the assembly 92 by a thrust bearing 96, so that it is rotatable about the axis 97 so that torsional stress in the cable 26 may be relieved. The connector 84 provides means of making and breaking the mechanical and electrical connections with the mating connector 22, which can be the same as the cable connector parts described subsequently, and shown in FIG. 8 and FIG. 9.

The azimuth and elevation of the connector 84 can be controlled, by means of servos 98, to match the azimuth and elevation of the cable 26 while the cable is being connected to the anchorage.

Figure 6:
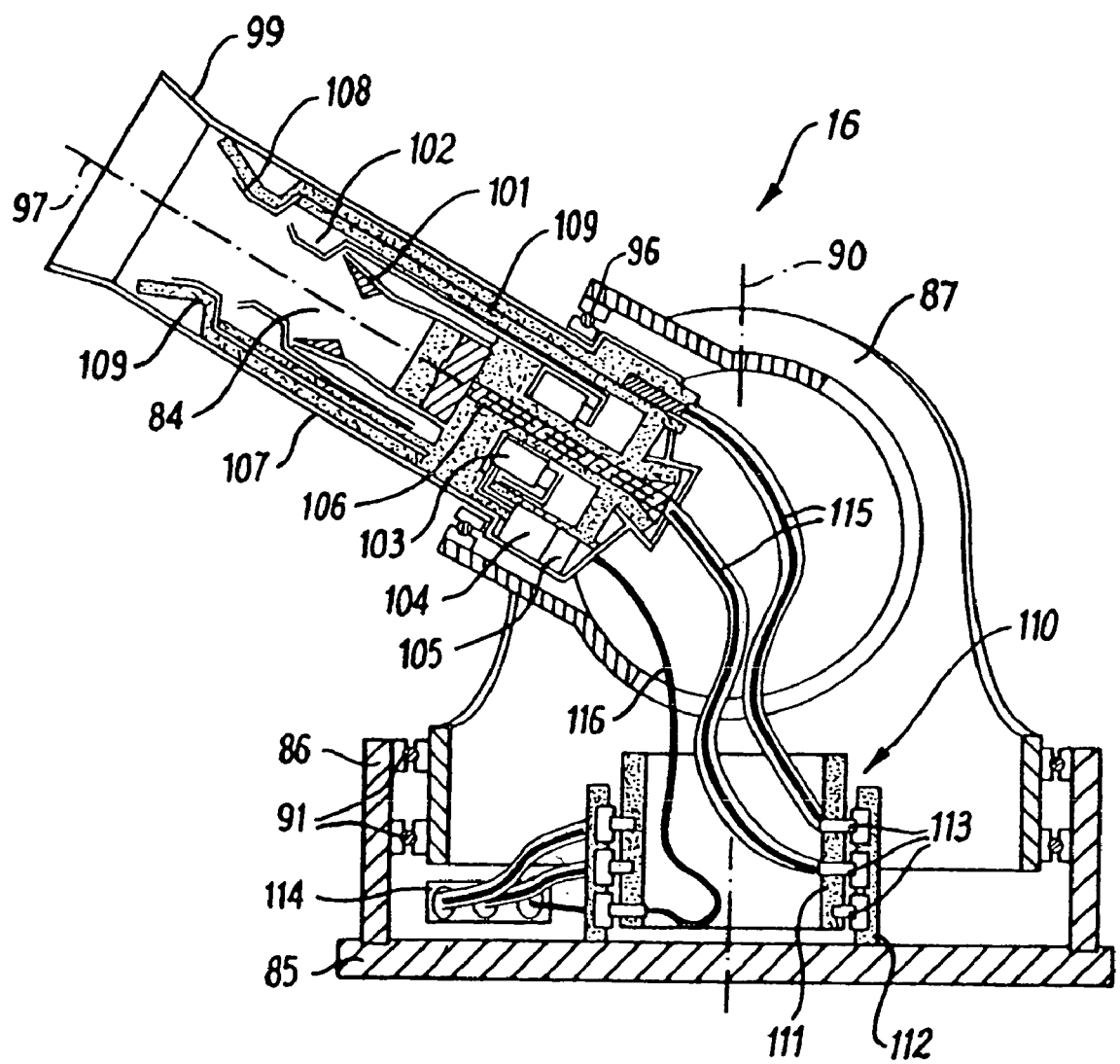
FIG. 6 is a diagrammatic cross sectional view through a cable anchorage usable in the present invention.

FIG. 6 is a schematic cross section through a similar cable anchorage unit 16 and the rotatable connector 84. The connector 84 is configured for the simpler dc cable design, shown in FIG. 4 as having two coaxial conductors 80 and 82 and an earthed sheath flared shroud 99 to guide the mating cable end connector 22 into engagement with the segmented gripping mechanism 101, which also provides the electrical contact for the high voltage core conductor 82. The gripping mechanism 101 is actuated by a non-conducting translating sleeve 102, which is driven by servos 103 powered by a power supply 104, incorporating a control unit 105. The tensile load from the cable 26 is transmitted through an insulated tie bar 106 to the outer casing 107 of the connector 84, and then through the thrust bearing 96, and through the bearings 94 and 91, to the fixed parts of the anchorage 16.

The connector 84 is provided with a second set of electrical contacts 108 for the high voltage annular conductor 80. The contacts 101 and 108 are insulated from each other, and from the earthed shroud 99, by means of insulating materials 109.

A high voltage slip ring apparatus 110, comprising a fixed assembly 111 and a rotatable assembly 112, and containing a plurality of slip rings 113, facilitates electrical connections between the rotatable connector 84 and the fixed ground connection panel 114, via flexible insulated cables 115 and a flexible earth cable 116. The slip ring apparatus can be mounted either on the movable assembly 92, or as shown on the fixed base 85 of the anchorage unit 16. Optionally the slip ring apparatus 110 may be filled with an appropriate dielectric fluid to minimise the risk of any arcing between the slip rings 113.

For ac transmission a third set of contacts 108, extra insulation 109, an extra slip ring 113, and a third flexible insulated cable 115 can be added.

For clarity, the bearings 91, 94 and 96 in FIG. 5 and in FIG. 6 are illustrated as rolling element ball bearings, but other arrangements and types of bearing could be used.

Figure 7:
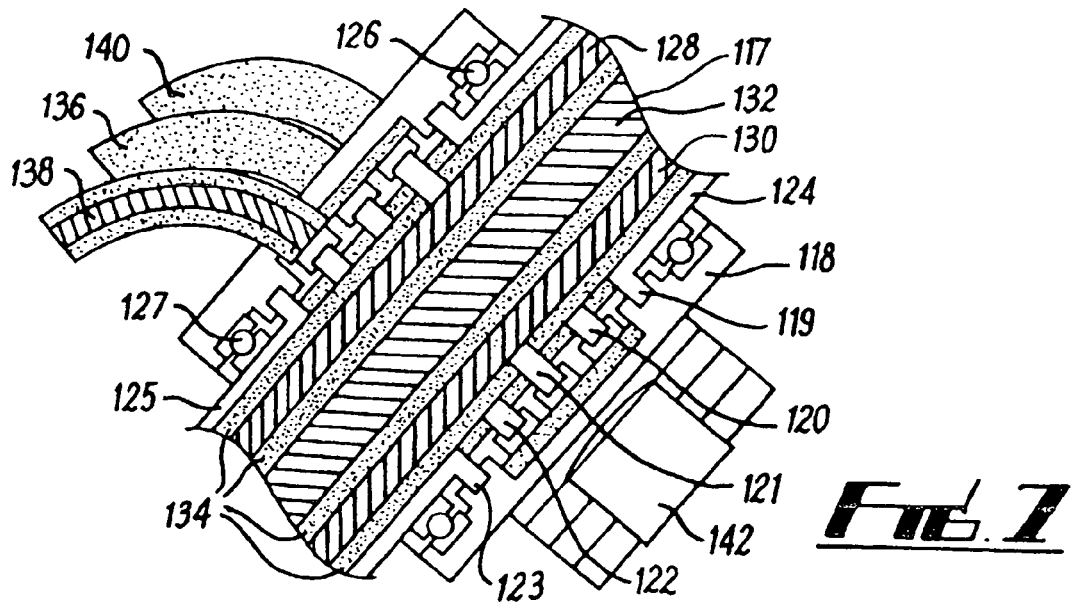
FIG. 7 is a diagrammatic cross sectional view through part of the apparatus of FIG. 1.

FIG. 7 shows how the mechanical and electrical connections can be made between a cable 117, which is similar to the cable in FIG. 3, and a rotating sleeve assembly 118, attached to a power unit 14. The electrical connections are made by means of low friction slip ring assemblies 119, 120, 121, 122 and 123. The slip ring assemblies 119 and 123 maintain earth continuity between the rotating sleeve assembly 118 and the upper and lower sections of the outer sheaths 124 and 125. The outer sheaths 124 and 125 are formed in such a way that they are relatively flexible, for example by corrugation or by braided construction, but they are still capable of taking a small tensile load when the cable 117 is loaded. Continuity of this tensile load at either end of the rotating sleeve assembly 118 may be ensured by low friction thrust bearings 126 and 127, which also ensure that significant torsional loads are not transmitted between the sleeve assembly 118 and the cable 117.

The slip ring assemblies 120, 121 and 122 connect with the three low voltage conductors (only two of which, 128 and 130, are shown in this cross-section). The three high voltage conductors (only one of which, 132, is shown in this cross-section) are not exposed at every wind turbine unit, but only at the ends of the cable segments. The conductors 128, 130 and 132 are isolated by electrically insulating materials 134.

If however the cable is similar to the dc cable in FIG. 4, then the electrical connections can be simplified by the deletion of one of the slip ring assemblies 120, 121 or 122, but then the remaining slip rings must be designed for higher voltages.

Flexible insulated electrical connections 136, 138 and 140 are made between the rotating sleeve assembly 118 and the wind power unit (not shown in this figure). The mechanical attachment of the wind power unit to the rotating sleeve is by means of a set of gimbals 142 (only a small proportion of which is seen in the figure). The set of gimbals 142 is engineered to provide pre-determined ranges of angular movement to enable the wind turbine unit, under almost all circumstances, to align itself to the relative wind velocity vector, but to prevent the cable 107 from snagging the turbine rotors and the aerodynamic surfaces of the wind power unit under more extreme conditions.

In use, each segment 20, 24, 26 of the cable and corresponding power units 14 can take off for example from an airfield, or when required can land at the airfield, and can be assembled into a stack as shown in FIG. 1 using the connectors 22 and 23. With the separate segments 20, 24, 26, any individual segment can be removed from the main stack for maintenance. To enable this to take place each segment 20, 24, 26 has means to automatically make or break mechanical and electrical connections with adjacent segments 20, 24, 26, in a controlled manner to prevent, significant impact or recoil loads or arcing between contacts.

Figure 8:
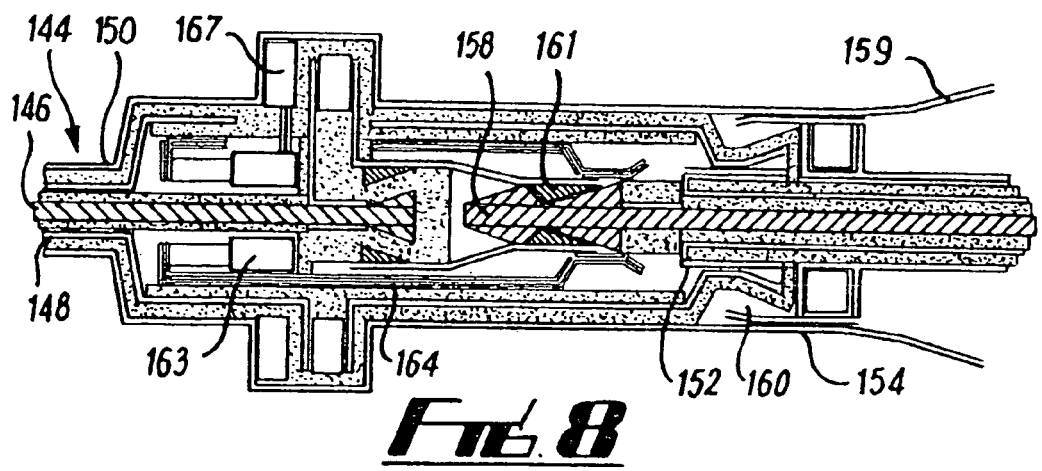
FIGS. 8 and 9 are diagrammatic cross sectional views showing connection arrangements usable with the apparatus of FIG. 1, respectively in an engaged condition and a partially disengaged condition.
Figure 9:
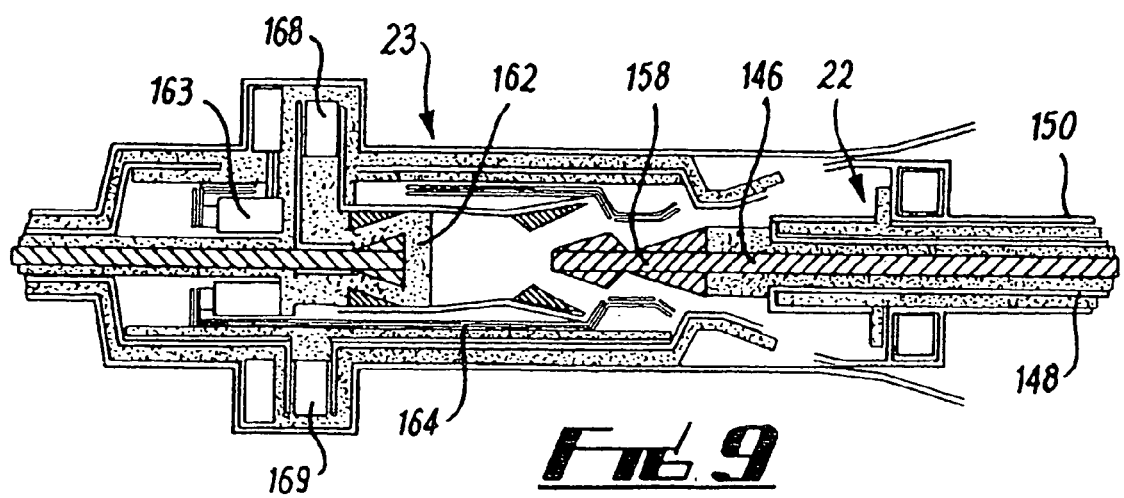

FIGS. 8 and 9 show an arrangement for connecting two segments of the simpler dc design of cable 144, which has two coaxial main conductors 146, 148, and an earthed sheath 150. FIG. 8 shows the arrangement in a fully engaged condition with the two connector parts 22 and 23 locked together whilst FIG. 9 shows the arrangement in a partially disengaged condition.

With the cable 144, the core conductor 146 takes almost all of the cable tension, as there are sliding joints 152, 154 between the annular conductors 148 and the earthed sheaths 150. The lower end of the upper cable segment is fitted with a probe 158, and the upper end of the lower segment is fitted with a drogue 159. The axes of these fittings must be reasonably well aligned axially before they are brought into contact, but there is no need for the fittings to be clocked in any particular angular relationship with each other. Initial contact is made between the earthed drogue 159 and an earthed sleeve 160 around the probe 158. The probe 158 is then guided through a gripping mechanism, 161, which is sprung open, until the probe comes up against an insulated stop 162. Gripping segments of the mechanism 161 are then brought into contact with the probe 158 by the action of servos 163 on an axially translating sleeve 164, which is slid into its locking position. If the probe 158 is incorrectly positioned, then the sleeve 164 cannot be slid into its locking position. When the sleeve 164 is in its locking position the gripping mechanism 161 is prevented from opening, and the probe 158 is held securely. The servos 163 are energized by power supply units 167, which are under remote control. Preferably the remote control is by means of radiotelephony.

In order to disengage the coupling, the locking sleeve 164 must be moved away from its locking position around the gripping segments. This is only possible if the frictional force between the sleeve 164 and the gripping segments is low, but high tensile loads or bending moments on the coupling will result in high frictional forces between these components preventing the coupling from being unlocked. This is a useful safety feature, because disengaging the coupling while it is taking a high tensile load would result in rapid separation of the cable ends and longitudinal vibrations in the cables, which could damage the wind power units 14.

The electrical connection of the cable segment connectors 22 and 23, other than the earth connection, is controlled separately from the mechanical connection by means of electrical switches 168 and 169. The first switch 168 is for the core conductors 146, and the second switch 169 is for the annular conductors 148. These switches serve to isolate the high voltage lines of the adjacent cable segments while the cables are in the process of mechanical connection or disconnection. The switches are preferably not required to act as high current dc circuit breakers. Therefore the switches may be compact designs utilising thyristors.

This basic connector design can be developed to cater for a three-phase ac transmission through the cable by the addition of a further set of annular conductors and connectors, coaxial with the first two. Signal cables embedded in the main cables do not necessarily need direct electrical connection between the cable segments. Signals can be transmitted by short-range radiotelephony or by optical means.

The electrical generators 52 may operate at a lower voltage than the conductors in the cable 12 so that the weight of insulation and overall weight of the generators is optimised. The transformers 33 raise the output voltage from the generators 52 to the voltage of the cable 12. The transformer 33 may be mounted on the wind power units 14 or on the cable 12. One transformer mounted on the cable may serve several wind power units, where the cable contains both high and low voltage conductors. Alternatively a rotatable transformer may be used in place of each power transmission assembly 32 and its associated transformer 33. In this case power is transmitted from the wind power unit 14 to the cable 12 by means of magnetic flux, one set of windings being attached to the wind power unit 14, and the other set being attached to the cable 12. Optionally ac power may be rectified to dc prior to transmission down the cable 12.

Each power unit 14 is provided with a set of receivers 61 for a global or differential global positioning system. The receivers 61 are placed at different positions on the unit 14 so as to enable the orientation of each unit 14 to be determined along with the location thereof. Additional receivers may be located on the cable connectors 22 and 23. Inertial navigation equipment may also be used, for example to provide more rapid feedback on changes in the orientation of units.

Each power unit 14 has its own remote control system independent of other units 14, such that a control failure on one unit 14 does not put in jeopardy the whole apparatus 10. Remote control is maintained by radiotelephony or other known means.

When flown in circular or near circular orbits, the paths of the power units 14 collectively describe the surface of a cone whose axis may be close to the vertical (when motoring in very light winds) or more or less inclined in the downwind direction (in order to boost power output in moderate wind speeds). FIG. 10 illustrates the apparatus 10 flying in very light winds 176, and stronger winds 178.

A figure-of-eight manoeuvre is shown in FIG. 11, which is viewed looking up the mean vector of the axis of the cable 12 from the anchorage 16. It will sometimes be preferred to a circular orbit. The arrows indicate the preferred direction of flight. The centre of the figure of eight is in a downwind direction from the anchorage 16. As the wind power units 14 are descending they are also retreating in the downwind direction, but potential energy is being expended and the crosswind velocity component maintains a high relative wind velocity so that power can continue to be extracted. As the wind power units 14 change direction at the ends of the figure-of-eight they are controlled to generate extra lift, which is vectored to provide the necessary centripetal acceleration. The extra lift enables the wind power units 14 to climb and advance upwind, giving a temporary increase in relative wind velocity to help minimise the induced drag. The figure-of-eight manoeuvre can also be flown in reverse, but the advantage of flying the manoeuvre in the direction shown is that it minimises the downwind velocity component, which helps to keep the cable taut in light winds.

The advantage of these manoeuvres is that they increase the mass flow of air through the plane of the turbine rotors 48 and so increase the potential power output. Other more complex crosswind manoeuvres and transitions could be flown, but they are all combinations of the simpler manoeuvres. In a stack, the velocity and power output of the power units 14 tends to increase with altitude, and so does the amplitude of the manoeuvre. The manoeuvres of adjacent stacks can also be coordinated. During these manoeuvres, and while generating power, the lift and drag on the wind power units 14 will be regulated so as not to overload individual units, or the cable 12 or its connectors.

FIGS. 12 and 13 show the main forces acting on a wind power unit 14 in a banked climb at point B in FIG. 11, whilst carrying out a figure-of-eight manoeuvre, as viewed in the downwind and crosswind directions respectively. The relative wind velocity is higher than the true wind speed, so power output can be increased. In FIG. 12 arrow 180 shows a lift vector, arrow 182 the inertial load, arrow 184 the unit weight, arrow 186 the cable load, and arrow 188 the resulting acceleration. In FIG. 13 the true wind velocity, unit climb velocity, and relative wind velocity are shown respectively by arrows 190, 192 and 194. The cable load is shown by arrow 196, the drag by arrow 198 and the lift vector by arrow 200.

In order to join two free-flying cable segments together the power units 14 are first controlled so that the cable segments are flown together in formation. The angles of inclination of the mating cable ends are aligned by differential control of the lift vectors of the individual power units 14 on each segment, and the segments are then brought together at a controlled closing velocity, in the manner of an aircraft hose and drogue in-flight refuelling system. The process can be repeated to build up longer trains of segments. The manoeuvre can be performed with the cable segments inclined at a wide range of angles from the nearly horizontal to the vertical, however the units in what will be the upper cable segment should always fly above the units in what will be the lower cable segment so that their wakes do not interact. To separate the segments, their power units are first controlled to unload most of the tension in the cable at the coupling, then the coupling is released and the two parts are flown apart.

The procedure for attaching the lowermost cable coupling or anchor to the anchorage for a stack of units depends on the variation of wind speed with altitude on the day. With moderately strong winds a powered free-flying stack will approach from downwind at a very low true air speed and at a very slow rate of descent. The cable will be almost vertical as it is plugged-in to the anchorage. As soon as the coupling is engaged the power units 14 towards the top of the stack are controlled to increase their lift vectors in order to increase the tension in the cable 12. The auxiliary power to those of the rotors 48 which were acting as propellers will then be switched off, and the stack will be allowed to drift back downwind to take up its normal inclination for power generation. The operation can be reversed to detach the stack, with auxiliary power applied first to straighten up the stack and to enable the tension at the base of the cable 12 to be reduced. The residual cable tension at the anchorage 16 must be positive so that the coupling separates, but low enough so that the recoil does not overstress the adjacent power units 14.

If the wind speed at low altitude is too low, then the power units operating at low altitude will be unable to support their own weight aerodynamically. However the cable 12 may still support them, using the aerodynamic lift generated by the power units 14 at higher altitudes.

If the wind speed is low at all altitudes then a more dynamic manoeuvre will be required so that the stack can be attached or detached from the anchorage. Under low wind conditions the stack can approach on a spiral path, so that while the upper power units 14 maintain their airspeed the lower units 14 are progressively slowed so that the cable anchor comes to rest at the anchorage 16 with the stack above it orbiting around it. The cable 12 supports the nearly stationary lower units 14 using the aerodynamic lift generated by the power units 14 at higher altitudes. Pointing the lowest units 14 in different directions, and applying auxiliary power selectively to their rotors, can fine-tune the position of the lower end of the cable. The manoeuvre can be reversed to detach the stack from the ground anchorage 16.

The same principles can be used to make or break intermediate connections within the stack while the bottom part of the stack remains attached to the ground anchorage. FIG. 14 shows a possible spiral approach manoeuvre for attaching a stack to the ground anchorage 16 in light winds. The upper power units 14 generate enough lift by orbiting to support the lower units 14, whilst the lowest power units 14 are steered to apply thrust to direct the bottom end of the cable 12.

For take-off from the ground, the wind power units attached to one cable segment will be lined up pointing into the wind. As they are accelerated forwards, the rearmost unit is the first to clear the ground, and the others then follow. The rearmost unit preferably flies highest to avoid the downwash from the units in front. However the unit second or third from the front may be the last to take off, to ensure that the front end of the fairly rigid cable does not snag on the ground. The power units will land in the reverse sequence.

FIG. 15 diagrammatically shows this arrangement where the direction of flight is shown by the arrow 202, and the wind direction by arrow 204. Optionally the wind power units may be towed into the air by a powerful aircraft operating as a glider tug. In this case all the wind power units would fly above the tug, which would be last to take-off.

In order to fly these manoeuvres, the power units will be under real time computer control, with continuous reassessment of a range of options for future action. The control of adjacent stacks will be co-ordinated. The weather around the stacks will be deduced using a wide range of data sources including weather radar and instrumentation on the power units. The most likely changes in absolute and relative wind velocities will be forecast. The disposition of the stacks will be modelled in detail and their dynamic behaviour will be predicted in advance. In this way the stacks can be operated safely under a wide range of conditions: anticipating the effects of weather fronts and gusts, damping any vibration, and coping with multiple failures, if necessary. Damping is achieved by predicting the energy in the various assembly modes, and commanding the control surfaces and rotors to apply incremental lift or drag forces in anti-phase to cancel out the unwanted vibration.

There is thus described a high altitude wind power generating apparatus. This apparatus permits a number of smaller units to be assembled together and operate in a single stack. These smaller units will have a higher power to weight ratio by virtue of the square-cube law. They will also tend to use less material, have smaller rotors and gearboxes, and can be mass produced making them more cost effective.

Having smaller rotors running at high speeds enables lower torque and lower ratio step-up gearboxes to be used for the generators. If multiple-pole generators are used it may be possible to avoid the need to use gearboxes. The apparatus can be deployed under its own autonomous or remote control to travel to remote locations. The apparatus can readily be serviced or maintained, without the whole of the apparatus having to land, and in fact the remainder of the apparatus could continue to operate whilst a part is undergoing maintenance.

Various other modifications may be made without departing from the scope of the invention. For instance, different numbers of power units, turbine units or sections of cable may be chosen. Obviously the cable may be a different length as required. The power units 14 may be connected to the cable 12 by different arrangements. For example, a spherical ball bushing could be used in place of gimbals, and a rotatable transformer could be used in place of separate transformer and slip ring assemblies. In addition to, or as an alternative to wings, lift may be provided by one or more autogiro like rotors rotating about a substantially vertical axis. In a further alternative, such rotors could be inclined so as to also generate power.

As an alternative to transmitting power along the cable by electricity, power could be transmitted by the flow of fluids. In such an instance the main cable is equipped with at least one passage, line or hose, for the transportation of fluids. Typically the cable is manufactured like a flexible hydraulic hose. A system with two lines may have one larger hose with a second smaller hose inside it. The wall of at least one hose is reinforced to take the tensile load so it can act as a tether. Alternatively the cable can have a multi-strand core of higher strength material, which takes the majority of the tensile load, and have several hoses arranged around it. A cable constructed in this way may also incorporate insulated electrical conductors in a hybrid design.

There are several ways in which the fluids can be used. They can be used to transmit hydraulic or pneumatic power up and down the cable, in conjunction with pumps in the air and motors on the ground. In a closed cycle system this requires at least one higher pressure line and at least one lower pressure line, but if air is used as the working fluid then an open circuit arrangement with a single line is possible. Air could be compressed to progressively higher pressures as it is sent down to the ground, with air-to-air heat exchangers providing intercooling between the wind turbine driven compressors. The airflow around the hose may provide additional cooling. The compression of the air is also be aided by gravity. The compressed air can then be stored either on or under the ground and used, when required, to drive turbines to generate electric power. Optionally the air may be heated to increase its power output. Some energy storage systems already exist using underground reservoirs for compressed air.

An alternative option is to transmit power using fluids which can be modified by a physical, a chemical or an electro-chemical reaction, such that the fluid or fluids flowing in one direction have higher internal energy than the fluid or fluids flowing in the reverse direction. For example hydrogen and oxygen could flow in one direction and water or steam in the opposite direction. The hydrogen and oxygen can be generated by electrolysis of water and they can be recombined later in a fuel cell to generate electricity. If there is a need to store energy then the reagents can be kept in storage tanks. This can be done either on the ground, or in the air, or both. Where fuel cells provide the wind power units with the auxiliary power needed for station keeping in light winds, and for deployment and recovery, then the fuel supply can be replenished while the units are on station, by pumping the higher energy reagents back up from the ground.

A preferred system may use reagents that can all be stored easily and inexpensively as liquids. It could, for example use a redox flow reversible fuel cell, using vanadium salt solutions or other known reagents. In this particular example four fluid lines would be needed to transport the solutions, which are characterised by the four different oxidation states of vanadium. Such fluids could also be used to provide renewable energy storage on the ground to provide power on demand. A hybrid system may also be attractive. In this case some of the wind energy would be used to generate electricity directly but the rest of the energy is converted into a renewable storable form using a fluid.

As a further alternative power may be transmitted independently of the cable directly to separate ground stations, for example by means of beams of microwave radiation. FIG. 16 diagrammatically shows such an arrangement. In this case the cable 12 does not need to transmit power, or to conduct electricity except perhaps to cater for lightning conduction. The microwave transmission aerials 212 are preferably in the form of phased array antennas conformal with the under-surface of the wind power units 14. The aerials 212 create a focussed beam 213 of microwave radiation, which can be directed to receiving aerials 214 mounted on the ground. The receiving aerials 214 may also be phased array antennas, located some distance from the anchorage point 16.

One ground based aerial array may receive microwave energy from many wind power units 14, perhaps from all the units 14 in a stack, and typically it will have a larger area than the airborne aerials 212. The ideal location for the receiving aerials 214 is downwind of the anchorage point 16, so the receiving aerials 214 may be positioned in accordance with the prevailing wind direction, or two or more receiving aerials may be used to accommodate the full range of wind directions. Separate receiving aerials 214 may be used for higher and lower altitude wind power units 14. Adjacent stacks may share receiving aerials 214. The wind power units 14 include control means (not shown) to enable the microwave beam to continue to be focussed on a receiving aerial array 214, or to be switched from one receiving array 214 to another, as the wind power units 14 are manoeuvred.

Stacks anchored offshore in the sea or in a lake may direct the microwave beams to onshore receiving aerials 214, or to aerial arrays mounted just off the coast in shallow water. These arrangements will work best where the cable anchorage is near to a coast and the prevailing winds blow "onshore" towards the land, as they often do on the west coasts of Europe and North and South America.

The microwave aerials 214 can also be operated such that microwave energy is directed up from the ground to the wind power generators, so that they can be powered to maintain altitude under light wind conditions. The wind power units 14 can also be energised in this way while they are detached from the anchorage 16. By switching between several ground-based aerials 214 the power units 14 can be deployed over significant distances without having to rely on onboard auxiliary power supplies.

The advantages of microwave power transmission are that the design of the cable 12 is simplified, connection of cable segments is simplified, underwater cables are not needed to connect with offshore anchorages, and auxiliary power storage systems may not be needed on the wind power units 14, provided they can be towed into the air for take-off. The disadvantages are the cost of the microwave systems and likelihood of higher power losses in the transmission.

Weight can be saved in the generators and transformers by operating at a higher frequency than conventional power grids. This makes it easier to rectify the electrical output of the generators and transmit direct current along the cable. The rectification may take place between the transformer and the connections to the cable. Relative to a three phase alternating current transmission this simplifies the design of a cable and the connections between sections of the cable. It also means that the power units would not need to synchronise their generators to produce useful power.

Alternatively the wind turbine rotors and associated generators on one segment of cable could be synchronised, and all of these could be synchronised with the power grid used for onwards transmission. This option is available in view of the apparatus' ability to manoeuvre to maintain the relatively consistent relative airspeed, and also the fact that it is driven by more consistent high altitude winds. Synchronising the rotors may be desirable to avoid unpleasant beat frequencies and make the noise more acceptable. It can be achieved using variable pitch rotors.

The control systems for the power units may be used to ensure that oscillations or vibrations within the apparatus are effectively damped.

As an alternative to providing electrical power through the cable or from fuel cells or batteries to drive the power units, some of the power units may include an internal combustion engine running on a hydrocarbon fuel. This engine could drive an auxiliary folding or retractable propeller, as used on some motor-gliders, or it could drive the main wind turbine rotors as propellers, either through a dedicated gearbox and clutch arrangement, or by generating electricity to run the generators as motors. Optionally some units may be configured solely to provide lift and propulsion for station keeping and/or deployment.

The drag and thrust on the apparatus 10 is related to the power output demanded and is controlled together with the lift.

The assembly 10 is not intended to be held in a precise position, but is intended to be manoeuvred continuously. For example, when wind shear is encountered, different power units 14 at different altitudes could be manoeuvred such that some lengths of cable between power units are temporarily slack. When such lengths of cable 12 become slack, the movement of the power units 14 would be monitored to ensure that the cable 12 does not contact the ground or other units 14. In addition, the movement of the units 14 is monitored to ensure that the cable is not given a sudden jerk, thereby overloading the cable. It is anticipated that the future behaviour and the control of each part of the apparatus 10 would be continually forecast for up to several minutes ahead using probabilistic variations on latest real time weather forecast and power demand scenarios.

If necessary, power generation can be reduced or suspended and power taken from the grid to ensure that the apparatus 10 contains sufficient potential and kinetic energy to remain safe. Alternatively, power could be taken from auxiliary power or propulsion systems for this purpose. The apparatus 10 is operated so as to maintain reserve of kinetic and potential energy in order to maximise the time available to respond to anticipated events. Potential and kinetic energy can also be exchanged during manoeuvring to help maintain a steady power output.

The apparatus could be operated to equalise the number of left hand and right hand turns of all wind power units, so as to minimise the torsional wind-up of the cable. Provided the torsional wind-up is monitored and regulated, then the cable connections to the wind power units can be simplified.

Lift units, for example in the form of one or more lighter than air members such as balloons or airships may be attached to the cable. Such members may aid deployment or recovery of the apparatus, and/or minimise the power input requirement in light wind conditions.

Referring to FIG. 17, there is shown a lifting unit 250 mounted on the cable 12 for assisting in lifting the power generating apparatus 10 to the desired position. A plurality of lifting units 251 could be spaced along the cable 12.

The lifting unit 251 comprises a pair of adjacent hulls 252 in the form of inflatable bodies 254 in which a gas of a lower density than air, for example helium, is provided. The lifting unit 251 is also provided with tail fins 256 and horizontal stabilisers 258 to stabilise the lifting unit 251. The lifting unit 251 also includes a central connecting member 260 having a cable holding formation 262. The connection member 260 extends between the hulls 252. The provision of twin hulls 252 has the advantage that the cable can pass through the connector member 260 between the hulls 252, rather than through the hulls 252.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Power generating apparatus, the apparatus comprising a power generating assembly including a plurality of power units each including a wind power turbine, the units being attached sequentially to a cable, with one end of the cable being mountable to the ground with the cable extending upwardly therefrom such that the power units are located above the ground and can be driven by the wind.

2. Apparatus according to claim 1, characterised in that each assembly includes greater than 20 power units.

3. Apparatus according to claim 2, characterised in that each assembly includes greater than 50 power units.

4. Apparatus according to claim 3, characterised in that each assembly includes greater than 100 power units.

5. Apparatus according to claim 1, characterised in that the cable is greater than 1,000 m long.

6. Apparatus according to claim 5, characterised in that the cable is greater than 5,000 m long.

7. Apparatus according to claim 1, characterised in that each wind power turbine includes one or more turbine rotors.

8. Apparatus according to claim 1, characterised in that some or all of the power units are configured to generate aerodynamic lift.

9. Apparatus according to claim 8, characterised in that the assembly is configured such that the aerodynamic lift generated by the power units in use maintains the cable substantially taut.

10. Apparatus according to claim 8, characterised in that some or all of the power units include a wing to generate aerodynamic lift.

11. Apparatus according to claim 8, characterised in that some or all of the power units include rotors to generate aerodynamic lift.

12. Apparatus according to claim 8, characterised in that some or all of the power units include a rotor or rotors rotatable about a substantially vertical axis in use, which rotors may provide power extraction and lift.

13. Apparatus according to claim 7, characterised in that the rotor or rotors are retractable, or movable.

14. Apparatus according to claim 1, characterised in that each power unit is attached to the cable such that the power unit can be optimally aligned relative to the wind velocity vector.

15. Apparatus according to claim 14, characterised in that a mounting means is provided on each power unit which mounting means permits the units to freely rotate about the cable, whereby to prevent significant torsional loads on the cables.

16. Apparatus according to claim 15, characterised in that the mounting means is in the form of gimbals or a ball bushing, and the centre of rotation is at or close to the centre of gravity of the power units.

17. Apparatus according to claim 8, characterised in that the lift vector of each power unit is adjustable in magnitude and direction.

18. Apparatus according to claim 17, characterised in that adjustable aerodynamic control surfaces are provided to permit adjustment of the lift vector.

19. Apparatus according to claim 17, characterised in that some or all of the power units include rotors with variable cyclic and/or collective pitch to permit adjustment of the lift vector.

20. Apparatus according to claim 17, characterised in that the assembly is configured such that by adjusting the lift vectors of some or all of the power units, the altitude of the power units and also the tension in the cable can be controlled.

21. Apparatus according to claim 17, characterised in that the assembly is configured such that by adjusting the lift vectors of some or all of the power units it is possible to manoeuvre the assembly relative to the wind vector field.

22. Apparatus according to claim 17, characterised in that control means are provided to permit the lift vectors of each power unit to be controlled.

23. Apparatus according to claim 1, characterised in that the assembly includes means for providing power to drive one or more of the power units so as to provide lift.

24. Apparatus according to claim 23, characterised in that the assembly is arranged such that power can be provided through the cable to drive said one or more power units as a motor, with the turbine rotor acting as a propeller.

25. Apparatus according to claim 1, characterised in that said one or more power units include an internal combustion engine to selectively drive the unit.

26. Apparatus according to claim 25, characterised in that the engine drives the turbine rotor, or may generate electricity to cause the turbine to operate.

27. Apparatus according to claim 25, characterised in that the internal combustion engine drives an auxiliary propeller, which propeller may be featherable, retractable and/or foldable.

28. Apparatus according to claim 1, characterised in that the assembly is selectively detachable from the ground.

29. Apparatus according to claim 28, characterised in that the assembly is arranged such that when detached the assembly can be flown, propelled by at least some of the powered power units, to a required location.

30. Apparatus according to claim 28, characterised in that the apparatus includes a cable anchorage.

31. Apparatus according to claim 30, characterised in that the cable anchorage is arranged so as to permit the cable when attached thereto, to be movable relative to the anchorage in three dimensions, while maintaining electrical connection therewith.

32. Apparatus according to claim 30, characterised in that the cable is arranged to transmit power generated by the units to the cable anchorage.

33. Apparatus according to claim 32, characterised in that two or more insulated electrical conductors are provided in the cable for transmitting power generated by the units to the cable anchorage.

34. Apparatus according to claim 33, characterised in that a potential difference is provided between the electrical conductors.

35. Apparatus according to claim 15, characterised in that electrical connections are provided between the units and electrical conductors in the cable.

36. Apparatus according to claim 35, characterised in that the connections are in the form of slip rings.

37. Apparatus according to claim 35, characterised in that the connections are in the form of an electrical transformer.

38. Apparatus according to claim 37, characterised in that the transformer includes a first set of windings attached to the unit, and a second set attached to the cable.

39. Apparatus according to claim 1, characterised in that power is transported along the cable by the flow of one or more fluids in pipes located in the cable.

40. Apparatus according to claim 39, characterised in that the downwards flowing fluid is held at a higher pressure than the upwards flowing fluid.

41. Apparatus according to claim 39, characterised in that power is transmitted by means of the pressure differential, or by means of chemical changes in the fluid such that the downward flowing fluid has higher internal energy than the upwards flowing fluids.

42. Apparatus according to claim 1, characterised in that power is transmitted from the power units independently of the cable.

43. Apparatus according to claim 42, characterised in that power is transmitted by beams of microwave radiation.

44. Apparatus according to claim 1, characterised in that the assembly includes lightning strike handling equipment.

45. Apparatus according to claim 44, characterised in that the assembly includes any of protective earth conductors, Faraday cages, or electrodes.

46. Apparatus according to claim 1, characterised in that one or more transponders is provided on the assembly to warn aircraft of the existence and location of the assembly.

47. Apparatus according to claim 1, characterised in that one or more of the power units includes energy storage systems such that said unit or units can be driven using power from the energy storage systems.

48. Apparatus according to claim 47, characterised in that the energy storage systems uses batteries or includes a chemically transformable fluid, and such energy storage systems may be selectively rechargeable as required.

49. Apparatus according to claim 1, characterised in that the apparatus is arranged such that an assembly can take off from the ground and/or land on the ground, with the power units acting as aircraft.

50. Apparatus according to claim 49, characterised in that the apparatus is arranged such that an assembly can take off from the ground and/or land on the ground with at least some of the power units powered to take off in the nature of an aeroplane.

51. Apparatus according to claim 48, characterised in that the apparatus is arranged such that an assembly can take off from the ground and/or land on the ground with at least some of the power units powered to take off in the nature of an aeroplane.

52. Apparatus according to claim 50, characterised in that during take off the power units have power provided by microwave aerials or photocells.

53. Apparatus according to claim 1, characterised in that the apparatus is arranged such that an assembly can be towed by an aircraft during take off and/or landing on the ground.

54. Apparatus according to claim 1, characterised in that the power units include fixed or retractable undercarriage units.

55. Apparatus according to claim 1, characterised in that detachable carts are provided upon which the power units can ride during take-off, but which carts remain on the ground.

56. Apparatus according to claim 7, characterised in that detachable carts are provided upon which the power units can ride during take-off, but which carts remain on the ground.

57. Apparatus according to claim 1, characterised in that each power unit has a discrete control system.

58. Apparatus according to claim 57, characterised in that the control system is remotely operable, desirably by radio-telephony.

59. Apparatus according to claim 1, characterised in that the cable is provided in a number of detachable segments such that the length of the cable can be varied.

60. Apparatus according to claim 59, characterised in that a plurality of power units are provided on each segment.

61. Apparatus according to claim 59, characterised in that each segment is arranged to be selectively disengageable from a power source in the cable in adjacent segments.

62. Apparatus according to claim 1, characterised in that the spacing of the power units on the cable varies along the length thereof, and for instance the spacing reduced away from the ground.

63. Apparatus according to claim 1, characterised in that the thickness of the cable reduces away from the ground.

64. Apparatus according to claim 1, characterised in that one or more lift units are provided on the cable, for generating aerodynamic lift to the cable.

65. Apparatus according to claim 64 characterised in that the, or each, lift unit is substantially devoid of wind power turbines.

66. Apparatus according to claim 64 characterised in that the, or each, lift unit is capable of generating aerodynamic lift.

67. Apparatus according to claim 1, characterised in that one or more lighter than air members is attached to the cable to provide lift.

68. Apparatus according to claim 67, characterised in that the lighter than air members are in the form of balloons or airships.

69. Apparatus according to claim 64 characterised in that the, or each, lift unit comprises first and second hulls, each hull comprises an inflatable member comprising a gas of less density than air, and the, or each, lift unit includes a connection member extending between the hulls wherein the cable extends through the connecting member.

70. Apparatus according to claim 64, characterised in that the lift units are provided on the cable towards the lower end thereof in use.

71. Apparatus according to claim 1, characterised in that one or more driving units are provided which include means for driving the unit but do not include a wind power turbine.

72. Apparatus according to claim 71, characterised in that the unit driving means includes at least one motor driven propeller.

73. Apparatus according to claim 71 characterised in that the driving units include means for generating aerodynamic lift.

74. Apparatus according to claim 71, characterised in that each wind power turbine includes one or more electrical generators.

75. Apparatus according to claim 74, characterised in that the or each generator operates at a first lower voltage, which voltage is transformed to a second higher voltage for transmission along the cable.

76. Apparatus according to claim 37, characterised in that the or each generator operates at a first lower voltage, which voltage is transformed to a second higher voltage for transmission along the cable.

77. Apparatus according to claim 74, characterised in that each power unit includes a step up gear box to enable both the rotors and the electrical generators to run at their optimum speeds.

78. Apparatus according to claim 74, characterised in that the apparatus is arranged such that during operation the alternating current generators for each power unit can be synchronised, and the power generators could be synchronised with the local power grid for onwards transmission.

79. Apparatus according to claim 1, characterised in that the apparatus is arranged such that oscillations or vibrations within a power generating assembly are effectively damped.

80. Apparatus according to claim 1, characterised in that each power unit, lift unit and/or driving unit is preferably provided with a set of receivers for a local or a global positioning system, and desirably for a differential global positioning system.

81. Apparatus according to claim 80, characterised in that a plurality of receivers for a global positioning system are provided on each power unit, lift unit and/or driving unit at different positions on the unit to enable the orientation of each unit to be determined.

82. Apparatus according to claim 59, characterised in that each power unit, lift unit and/or driving unit is preferably provided with a set of receivers for a local or a global positioning system, and desirably for a differential global positioning system.

83. Apparatus according to claim 1, characterised in that each power unit includes two wind power turbines, with desirably one on each side thereof.

84. Apparatus according to claim 1, characterised in that each power unit includes a wing.

85. Apparatus according to claim 84, characterised in that the wing includes one or more pivotal control surfaces.

86. Apparatus according to claim 84, characterised in that the wind power turbines are mounted on the wing.

87. Apparatus according to claim 84, characterised in that each power unit is configured such that in a normal orientation the wing extends substantially horizontally, with the rotors of the wind power turbines facing the relative wind velocity vector.

88. Apparatus according to claim 84, characterised in that the rear of each power unit includes a pair of spaced booms extending rearwardly from the wing to the empennage, to provide clearance for the cable.

89. Apparatus according to claim 83, characterised in that each power unit is provided with variable pitch control.

90. Apparatus according to claim 1, characterised in that the apparatus includes a plurality of assemblies, each with a cable and a plurality of power units.

91. Apparatus according to claim 90, characterised in that the apparatus is arranged such that each assembly can be controlled to prevent contact between the cables and power units of adjacent assemblies.

92. A method of operating a power generating apparatus according to claim 1, the method including maintaining an assembly trailing downwind in high and moderately high wind speed conditions.

93. A method according to claim 92, characterised in that the method also includes, when the wind speed reduces, controlling the power units, lift units and/or driving units such that the assembly moves substantially in a circle above the ground mounting so that if the cable remains taut the assembly defines an imaginary cone.

94. A method according to claim 92, characterised in that the method includes when the wind speed reduces, controlling the power units, lift units and/or driving units such that the assembly moves substantially in a figure of eight above the ground, while the fixed length of the cable remains substantially taut.

95. A method according to claim 92, characterised in that the method includes controlling the power units, lift units and/or driving units such that the tension in the cable is regulated.

96. A method according to claim 92 when dependent upon claim 59, characterised in that the segments of cable and power units thereon take off one at a time, and are sequentially mounted to the ground and to each other in a required position once airborne.

97. A method according to claim 92, characterised in that the method includes substantially equalising the number of left hand and right hand turns of the power units around the cable, to minimise the torsional wind-up of the cable.

98. Apparatus according to claim 51, characterised in that during take off the power units are powered by their energy storage systems.

99. Apparatus according to claim 48, characterised in that the turbine rotor or rotors are folded or feathered in a horizontal position for landing.

100. Apparatus according to claim 76, characterised in that the first voltage is transformed to the second voltage by the electrical transformers.

101. Apparatus according to claim 82, characterised in that receivers for a positioning system are also provided on connectors at the ends of the cable segments.

* * * * *